United States Patent
Yamamoto (10) Patent No.: US 7,656,591 B2
(45) Date of Patent: Feb. 2, 2010

(54) RETROFOCUS LENS SYSTEM AND IMAGE-TAKING DEVICE

(75) Inventor: Hiroshi Yamamoto, Kawasaki (JP)

(73) Assignee: Nikon Corporation, Tokyo (JP)

( * ) Notice: Subject to any disclaimer, the term of this patent is extended or adjusted under 35 U.S.C. 154(b) by 198 days.

(21) Appl. No.: 11/674,003

(22) Filed: Feb. 12, 2007

(65) Prior Publication Data

US 2007/0223114 A1 Sep. 27, 2007

(30) Foreign Application Priority Data

Mar. 23, 2006 (JP) ............................. 2006-081087
Jan. 24, 2007 (JP) ............................. 2007-014001

(51) Int. Cl.
*G02B 13/04* (2006.01)
*G02B 11/34* (2006.01)

(52) U.S. Cl. ...................................... 359/750; 359/749

(58) Field of Classification Search .......... 359/749–753
See application file for complete search history.

(56) References Cited

U.S. PATENT DOCUMENTS

| | | | |
|---|---|---|---|
| 4,025,170 A | 5/1977 | Kawamura | |
| 4,099,849 A | * | 7/1978 | Lawson et al. .............. 359/750 |
| 4,764,000 A | 8/1988 | Tokumaru | |
| 4,770,512 A | * | 9/1988 | Ikari ........................ 359/708 |
| 5,315,441 A | 5/1994 | Hori et al. | |
| 6,181,488 B1 | 1/2001 | Yoneyama et al. | |
| 6,560,042 B2 | 5/2003 | Murata et al. | |
| 2002/0034021 A1 | 3/2002 | Murata et al. | |
| 2005/0134968 A1 | 6/2005 | Ogata | |

FOREIGN PATENT DOCUMENTS

| | | |
|---|---|---|
| JP | 57-005012 A | 11/1982 |
| JP | 08-179196 A | 7/1996 |
| JP | 2932603 B2 | 5/1999 |
| JP | 2002-72084 A | 3/2002 |
| JP | 3312129 B2 | 5/2002 |
| JP | 2004-245893 A | 2/2004 |
| JP | 2005-181852 A | 7/2005 |

* cited by examiner

*Primary Examiner*—Scott J Sugarman
(74) *Attorney, Agent, or Firm*—Miles & Stockbridge P.C.

(57) ABSTRACT

Providing a retrofocus lens system and an image-taking device having small variation in aberrations upon focusing on a close object with a high imaging magnification. The retrofocus lens system includes, in order from an object, a first lens group G1 having negative refractive power, a second lens group G2 having negative refractive power, and a third lens group G3 having positive refractive power. Upon focusing from infinity to a close object, the first lens group G1, the second lens group G2, and the third lens group G3 are moved to the object such that a distance between the first lens group G1 and the second lens group G2 increases, and a distance between the second lens group G2 and the third lens group G3 decreases.

16 Claims, 7 Drawing Sheets

RETROFOCUS LENS SYSTEM AND IMAGE-TAKING DEVICE

The disclosure of the following priority applications are herein incorporated by reference:
Japanese Patent Application No. 2006-081087; and
Japanese Patent Application No. 2007-014001.

BACKGROUND OF THE INVENTION

1. Field of the Invention

The present invention relates to a retrofocus lens system suitable for a single-lens reflex camera and a digital camera, and an image-taking device.

2. Related Background Art

Focusing of an imaging lens is generally carried out by extending the whole lens system to an object side. However, when this focusing method is applied to a retrofocus type wide-angle lens, since variation in spherical aberration and astigmatism is large upon focusing on a close object, there happens to be a problem that good optical performance cannot be obtained. Accordingly, in order to preferably suppress variation in aberration upon focusing on a close object, there has been proposed a retrofocus lens system applying a floating method in such as Japanese Patent Application Laid-Open No. 2005-181852.

The lens system disclosed in Japanese Patent Application Laid-Open No. 2005-181852 is composed of, in order from an object, a first lens group having negative refractive power, a second lens group having positive refractive power, and a third lens group having positive refractive power. Upon focusing on a close object, the first lens group is fixed, a distance between the first lens group and the second lens group increases, and a distance between the second lens group and the third lens group decreases However, since the second lens group has positive refractive power, distortion is generated excessively upon focusing to cause a problem. Moreover, since the first lens group is fixed upon focusing, sufficient correction of aberrations upon focusing on a close object cannot be carried out to cause another problem.

SUMMARY OF THE INVENTION

The present invention is made in view of the aforementioned problems and has an object to provide a retrofocus lens system and an image-taking device having small variation in aberrations upon focusing on a close object with a high imaging magnification.

According to a first aspect of the present invention, there is provided a retrofocus lens system including, in order from an object: a first lens group having negative refractive power; a second lens group having negative refractive power; and a third lens group having positive refractive power; wherein upon focusing from infinity to a close object, the first lens group, the second lens group, and the third lens group are moved to the object such that a distance between the first lens group and the second lens group increases, and a distance between the second lens group and the third lens group decreases.

In a zoom lens system according to the first aspect of the present invention, the following conditional expression (1) is preferably satisfied:

$$-30 < \Delta D1/(\beta \cdot D1) < -7 \quad (1)$$

where $\beta$ denotes an imaging magnification upon focusing on a close object, D1 denotes a distance between the first lens group and the second lens group upon focusing on infinity, and $\Delta D1$ denotes variation in the distance between the first lens group and the second lens group upon focusing from infinity to a close object with an imaging magnification of $\beta$.

In a zoom lens system according to the first aspect of the present invention, it is preferable that the imaging magnification $\beta$ is a magnification $\beta m$ upon focusing on an object locating at the minimum imaging distance.

In a zoom lens system according to the first aspect of the present invention, the following conditional expression (2) is preferably satisfied:

$$0.25 < (-\beta m) \quad (2)$$

where $\beta m$ denotes an imaging magnification upon focusing on an object locating at the minimum imaging distance.

In a zoom lens system according to the first aspect of the present invention, the following conditional expression (3) is preferably satisfied:

$$\Delta D1 = -\Delta D2 \quad (3)$$

where $\Delta D1$ denotes variation in the distance between the first lens group and the second lens group upon focusing from infinity to a close object with an imaging magnification of $\beta$, and $\Delta D2$ denotes variation in the distance between the second lens group and the third lens group upon focusing from infinity to a close object with an imaging magnification of $\beta$.

In a zoom lens system according to the first aspect of the present invention, the following conditional expression (4) is preferably satisfied:

$$0.1 < f1/f2 < 10 \quad (4)$$

where f1 denotes a focal length of the first lens group, and f2 denotes a focal length of the second lens group.

In a zoom lens system according to the first aspect of the present invention, it is preferable that the first lens group consists of, in order from the object, a negative meniscus lens having a convex surface facing the object, and a positive lens.

In a zoom lens system according to the first aspect of the present invention, the following conditional expression (5) is preferably satisfied:

$$0.5 < (r2+r1)/(r2-r1) < 3.0 \quad (5)$$

where r1 denotes a radius of curvature of the object side surface of the positive lens in the first lens group, and r2 denotes a radius of curvature of the image side surface of the positive lens in the first lens group.

In a zoom lens system according to the first aspect of the present invention, the following conditional expression (6) is preferably satisfied:

$$60 < \nu 32 < 83 \quad (6)$$

where $\nu 32$ denotes Abbe number of a glass medium of the second lens from the image side of the third lens group at d-line which has a wavelength $\lambda = 587.6$ nm.

In a zoom lens system according to the first aspect of the present invention, it is preferable that an aperture stop is included in the third lens group.

In a zoom lens system according to the first aspect of the present invention, it is preferable that each lens surface of the retrofocus lens system is formed by a spherical surface or a plane surface.

According to a second aspect of the present invention, there is provided an image-taking device equipped with the retrofocus lens system according to any of the first aspect of the present invention.

According to a third aspect of the present invention, there is provided a method for forming an image of an object by focusing a retrofocus lens system comprising steps of: providing the retrofocus lens system including, in order from an object, a first lens group having negative refractive power, a second lens group having negative refractive power, and a third lens group having positive refractive power; and moving the first lens group, the second lens group, and the third lens group to the object, upon focusing from infinity to a close object, such that a distance between the first lens group and the second lens group increases, and a distance between the second lens group and the third lens group decreases.

In a method according to the third aspect of the present invention, the method preferably further includes a step of: satisfying the following conditional expression (1):

$$-30 < \Delta D1/(\beta \cdot D1) < -7 \qquad (1)$$

where $\beta$ denotes an imaging magnification upon focusing on a close object, D1 denotes a distance between the first lens group and the second lens group upon focusing on infinity, and $\Delta D1$ denotes variation in the distance between the first lens group and the second lens group upon focusing from infinity to a close object with an imaging magnification of $\beta$.

In a method according to the third aspect of the present invention, the method preferably further includes a step of: satisfying the following conditional expression (2):

$$0.25 < (-\beta m) \qquad (2)$$

where $\beta m$ denotes an imaging magnification upon focusing on an object locating at the minimum imaging distance.

In a method according to the third aspect of the present invention, the method preferably further includes a step of: satisfying the following conditional expression (3):

$$\Delta D1 = -\Delta D2 \qquad (3)$$

where $\Delta D1$ denotes variation in the distance between the first lens group and the second lens group upon focusing from infinity to a close object with an imaging magnification of $\beta$, and $\Delta D2$ denotes variation in the distance between the second lens group and the third lens group upon focusing from infinity to a close object with an imaging magnification of $\beta$.

Other features and advantages according to the present invention will be readily understood from the detailed description of the preferred embodiments in conjunction with the accompanying drawings.

BRIEF DESCRIPTION OF THE DRAWINGS

FIGS. 2A, and 2B are graphs showing various aberrations of the retrofocus lens system according to Example 1 in which

FIGS. 4A, and 4B are graphs showing various aberrations of the retrofocus lens system according to Example 2 in which

FIGS. 6A, and 6B are graphs showing various aberrations of the retrofocus lens system according to Example 3 in which

DESCRIPTION OF THE MOST PREFERRED EMBODIMENT

A retrofocus lens system and an image-taking device according to the present embodiment are explained below.

The retrofocus lens system according to the present embodiment includes, in order from an object, a first lens group having negative refractive power, a second lens group having negative refractive power, and a third lens group having positive refractive power. Upon focusing from infinity to a close object, the first lens group, the second lens group and the third lens group are moved to the object such that a distance between the first lens group and the second lens group increases, and a distance between the second lens group and the third lens group decreases.

With this configuration, it becomes possible to simultaneously correct coma, astigmatism and distortion generating upon focusing.

In a retrofocus lens system according to the present embodiment, the following conditional expression (1) is preferably satisfied:

$$-30 < \Delta D1/(\beta \cdot D1) < -7 \qquad (1)$$

where $\beta$ denotes an imaging magnification upon focusing on a close object, D1 denotes a distance between the first lens group and the second lens group upon focusing on infinity, and $\Delta D1$ denotes variation in the distance between the first lens group and the second lens group upon focusing from infinity to a close object with an imaging magnification of $\beta$.

Conditional expression (1) defines an appropriate range of a ratio of variation in the distance between the first lens group and the second lens group upon focusing relative to the imaging magnification. In a retrofocus lens system according to the present embodiment, by varying each distance between lens groups with satisfying conditional expression (1), astigmatism and coma can be corrected excellently.

When the ratio $\Delta D1/(\beta \cdot D1)$ is equal to or exceeds the upper limit of conditional expression (1), astigmatism is excessively corrected, and lower coma is also excessively corrected. In order to secure the effect of the present embodiment, it is preferable to set the upper limit of conditional expression (1) to −10.

On the other hand, when the ratio $\Delta D1/(\beta \cdot D1)$ is equal to or falls below the lower limit of conditional expression (1), astigmatism cannot be correct sufficiently, and lower coma also cannot be correct sufficiently. In order to secure the effect of the present embodiment, it is preferable to set the lower limit of conditional expression (1) to −15.

In a retrofocus lens system according to the present embodiment, it is preferable that the imaging magnification $\beta$ is a magnification $\beta m$ when the system is focused on an object locating at the minimum imaging distance.

With constructing in this manner, a retrofocus lens system according to the present embodiment can carry out the effect of conditional expression (1) upon focusing on a close object locating at the minimum imaging distance.

In a retrofocus lens system according to the present embodiment, the following conditional expression (2) is preferably satisfied:

$$0.25 < (-\beta m) \quad (2)$$

where βm denotes an imaging magnification upon focusing on an object locating at the minimum imaging distance.

With this configuration, a retrofocus lens system according to the present application makes it possible to accomplish a high imaging magnification upon imaging a close range object, so that it is desirable. When the value (−βm) is equal to or falls below the lower limit of conditional expression (2), a sufficient imaging magnification cannot be obtained upon imaging a close range object.

In order to secure the effect of the present embodiment, it is preferable to set the lower limit of conditional expression (2) to 0.3. In order to further secure the effect of the present embodiment, it is preferable to set the lower limit of conditional expression (2) to 0.4.

A retrofocus lens system according to the present embodiment preferably satisfies the following conditional expression (3):

$$\Delta D1 = -\Delta D2 \quad (3)$$

where ΔD1 denotes variation in the distance between the first lens group and the second lens group upon focusing from infinity to a close object with an imaging magnification of β, and ΔD2 denotes variation in the distance between the second lens group and the third lens group upon focusing from infinity to a close object with an imaging magnification of β.

Conditional expression (3) defines a ratio of a moving amount of the first lens group to that of the third lens group upon focusing. When the three lens groups are moved with different moving ratio with each other upon focusing, it is needless to say that variation in aberrations can be corrected excellently.

In a retrofocus lens system according to the present embodiment, with satisfying conditional expression (3), the moving amount of the first lens group and that of the third lens group upon focusing become the same. Thus lens barrel structure can be simpler than a case where the three lens groups are moved with different moving ratio with each other upon focusing. Accordingly, spherical aberration and curvature of field caused by decentering or mechanical accuracy can be lower, so it is preferable.

A retrofocus lens system according to the present embodiment preferably satisfies the following conditional expression (4):

$$0.1 < f1/f2 < 10 \quad (4)$$

where f1 denotes a focal length of the first lens group, and f2 denotes a focal length of the second lens group.

Conditional expression (4) defines an appropriate range of the focal length of the first lens group and that of the second lens group.

When the ratio f1/f2 is equal to or exceeds the upper limit of conditional expression (4), refractive power of the first lens group becomes large, and variation in astigmatism and coma upon focusing becomes large, so that it is undesirable. In order to secure the effect of the present embodiment, it is preferable to set the upper limit of conditional expression (4) to 6.0.

On the other hand, when the ratio f1/f2 is equal to or falls below the lower limit of conditional expression (4), refractive power of the first lens group becomes large, and variation in astigmatism and coma upon focusing becomes large, so that it is undesirable.

In a retrofocus lens system according to the present embodiment, it is preferable that the first lens group consists of, in order from the object, a negative meniscus lens having a convex surface facing the object, and a positive lens.

With this construction, variation in spherical aberration and distortion upon focusing can be suppressed.

In a retrofocus lens system according to the present embodiment, it is preferable that the following conditional expression (5) is satisfied:

$$0.5 < (r2+r1)/(r2-r1) < 3.0 \quad (5)$$

where r1 denotes a radius of curvature of the object side surface of the positive lens in the first lens group, and r2 denotes a radius of curvature of the image side surface of the positive lens in the first lens group.

Conditional expression (5) defines a shape of the second lens from the object side in the first lens group which is the positive lens in the first lens group.

When the ratio (r2+r1)/(r2−r1) is equal to or exceeds the upper limit of conditional expression (5), variation in spherical aberration becomes large, so that spherical aberration is excessively corrected upon focusing on a close object. In order to secure the effect of the present embodiment, it is preferable to set the upper limit of conditional expression (5) to 1.5.

On the other hand, when the ratio (r2+r1)/(r2−r1) is equal to or falls below the lower limit of conditional expression (5), an angle of deviation of the off-axis ray becomes large, and in particular sagittal image plane curves excessively, so that it is undesirable. In order to secure the effect of the present embodiment, it is preferable to set the lower limit of conditional expression (5) to 0.55.

In a retrofocus lens system according to the present embodiment, it is preferable that the following conditional expression (6) is satisfied:

$$60 < \nu 32 < 83 \quad (6)$$

where ν32 denotes Abbe number of a glass medium of the second lens of the third lens group counted from the image side at d-line (wave length λ=587.6 nm).

Conditional expression (6) defines an appropriate range of Abbe number of the second lens counted from the image side of the third lens group. In a retrofocus lens system according to the present embodiment, with selecting the glass material of the second lens satisfying conditional expression (6), it becomes possible to correct lateral chromatic aberration.

Accordingly, when the value ν32 is equal to or exceeds the upper limit, or is equal to or falls below the lower limit of conditional expression (6), it becomes impossible to sufficiently correct lateral chromatic aberration.

In a retrofocus lens system according to the present embodiment, it is preferable that an aperture stop is included in the third lens group. With this configuration, it becomes possible to preferably correct curvature of field.

In a retrofocus lens system according to the present embodiment, each lens surface is preferably formed by a spherical surface or a plane surface. With this configuration, since a less manufacturing error is introduced in a retrofocus lens system, it becomes possible to construct a lens system having high optical performance with little aberrations such as spherical aberration.

Moreover, an image-taking device according to the present embodiment is equipped with the above-mentioned retrofocus lens system. Accordingly, it becomes possible to realize an image-taking device having small variation in aberrations upon focusing on a close object with a high imaging magnification.

Each example of the retrofocus lens system according to the present embodiment is explained with reference to accompanying drawings.

EXAMPLE 1

Figure 1:
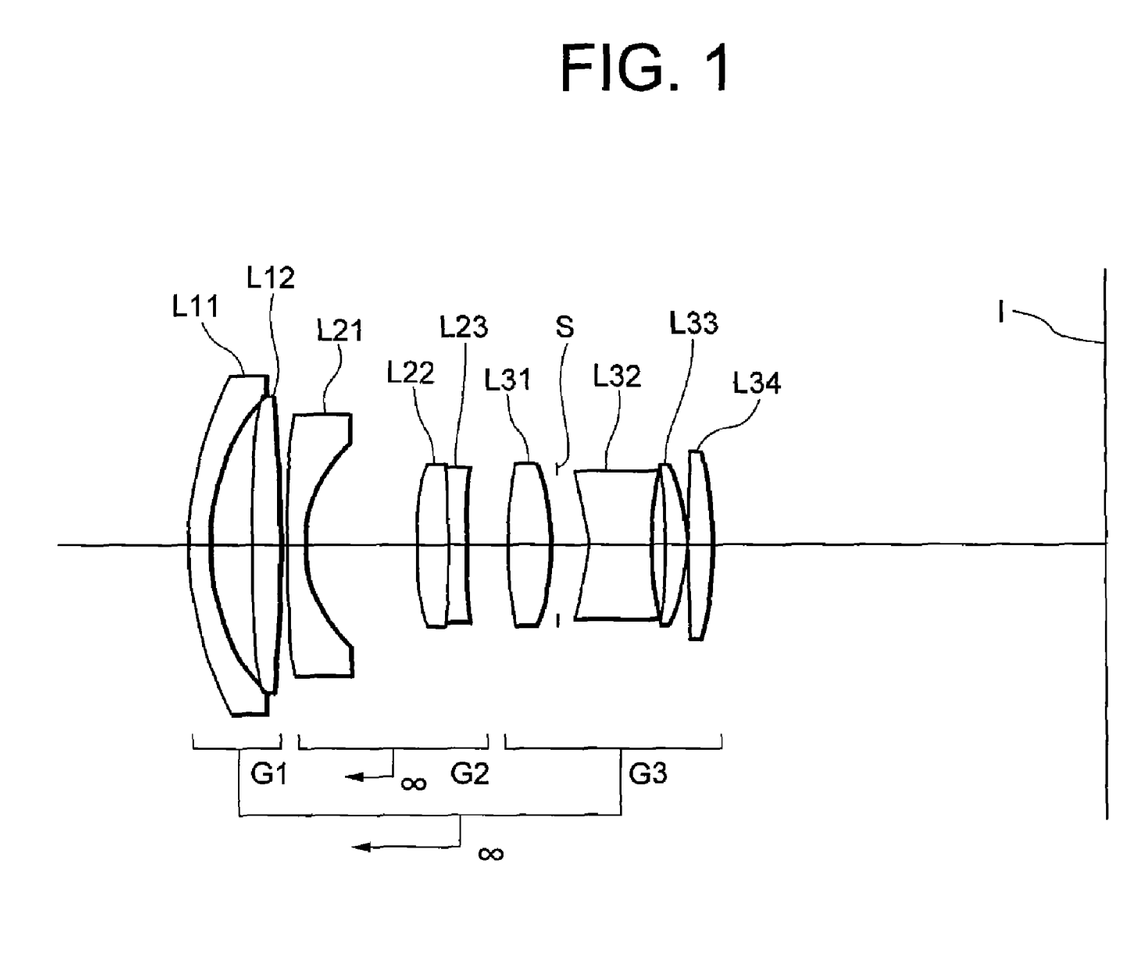
FIG. 1 is a diagram showing a lens configuration of a retrofocus lens system according to Example 1 of the present embodiment.

FIG. 1 is a diagram showing a lens configuration of a retrofocus lens system according to Example 1 of the present embodiment.

As shown in FIG. 1, the retrofocus lens system according to Example 1 consists of, in order from an object, a first lens group G1 having negative refractive power, a second lens group G2 having negative refractive power, and a third lens group G3 having positive refractive power.

The first lens group G1 consists of, in order from the object, a negative meniscus lens L11 having a convex surface facing the object, and a double convex positive lens L12.

The second lens group G2 consists of, in order from the object, a negative meniscus lens L21 having a convex surface facing the object, and a cemented positive lens constructed by a double convex positive lens L22 cemented with a double concave negative lens L23.

The third lens group G3 consists of, in order from the object, a double convex positive lens L31, an aperture stop S, a double concave negative lens L32, a positive meniscus lens L33 having a convex surface facing an image, and a double convex positive lens L34.

With this lens configuration, in the retrofocus lens system according to Example 1 of the present embodiment, upon focusing from infinity to a close object, the first lens group G1, the second lens group G2, and the third lens group G3 are moved to the object side such that a distance between the first lens group G1 and the second lens group G2 increases, and a distance between the second lens group G2 and the third lens group G3 decreases. In particular, upon focusing, the moving ratio of the first lens group G1 to the third lens group G3 is the same, in other words, the first lens group G1 and the third lens group G3 are moved to the object in a body.

Various values associated with the retrofocus lens system according to Example 1 are listed in Table 1.

In [Specifications], f denotes a focal length, FNO denotes an f-number, and 2ω denotes an angle of view.

In [Lens Data], the left most column shows the lens surface number counted in order from the object side, the second column shows a radius of curvature "r", the third column shows a distance "d" between the lens surfaces, the fourth column shows refractive index "nd" of the medium between the lens surfaces at d-line (wavelength λ=587.6 nm), and the fifth column shows Abbe number "vd" of the medium between the lens surfaces at d-line (wavelength λ=587.6 nm). In [Lens Data], r=∞ denotes a plane surface, refractive index of the air nd=1 is omitted.

In [Variable Distances], β denotes an imaging magnification, d0 denotes a distance between the object and the first lens surface, and respective variable distances are shown. In [Values for Conditional Expressions], respective values for conditional expressions are shown.

In the tables for various values, "mm" is generally used for the unit of length such as the focal length, the radius of curvature, and the distance to the next lens surface. However, since an optical system proportionally enlarged or reduced its dimension can be obtained similar optical performance, the unit is not necessarily to be limited to "mm", and any other suitable unit can be used.

The explanation of reference symbols is the same in the other examples, so that duplicated explanations are omitted.

TABLE 1

[Specifications]

| f = | 41.2 |
|---|---|
| FNO = | 2.89 |
| 2ω = | 72° |

[Lens Data]

| | r | d | nd | vd |
|---|---|---|---|---|
| 1) | 49.752 | 3.0 | 1.83481 | 42.72 |
| 2) | 32.115 | 5.7 | | |
| 3) | 130.000 | 4.1 | 1.75692 | 31.59 |
| 4) | −492.062 | (d4) | | |
| 5) | 138.964 | 2.4 | 1.49782 | 82.56 |
| 6) | 19.308 | 16.0 | | |
| 7) | 42.141 | 4.6 | 1.788 | 47.38 |
| 8) | −310.529 | 2.4 | 1.56732 | 42.72 |
| 9) | 73.800 | (d9) | | |
| 10) | 80.318 | 6.0 | 1.618 | 63.38 |
| 11) | −37.349 | 1.0 | | |
| 12) | ∞ | 4.5 | Aperture Stop S | |
| 13) | −28.492 | 9.2 | 1.71736 | 29.52 |
| 14) | 70.877 | 1.9 | | |
| 15) | −95.520 | 3.2 | 1.48749 | 70.45 |
| 16) | −25.721 | 0.1 | | |
| 17) | 270.998 | 3.4 | 1.804 | 46.58 |
| 18) | −59.752 | Bf | | |

[Variable Distances]

| | infinity | minimum imaging distance |
|---|---|---|
| β: | 0.00 | −0.50 |
| d0: | ∞ | 72.3 |
| d4: | 1.00 | 5.28 |
| d9: | 6.50 | 2.21 |

[Values for Conditional Expressions]

(1): ΔD1/(β · D1) = −8.56
(2): (−βm) = 0.50
(3): ΔD1 = 4.28
   −ΔD2 = 4.28
(4): f1/f2 = 6.30
(5): (r2 + r1)/(r2 − r1) = 0.58
(6): v32 = 70.76

Figure 2A:
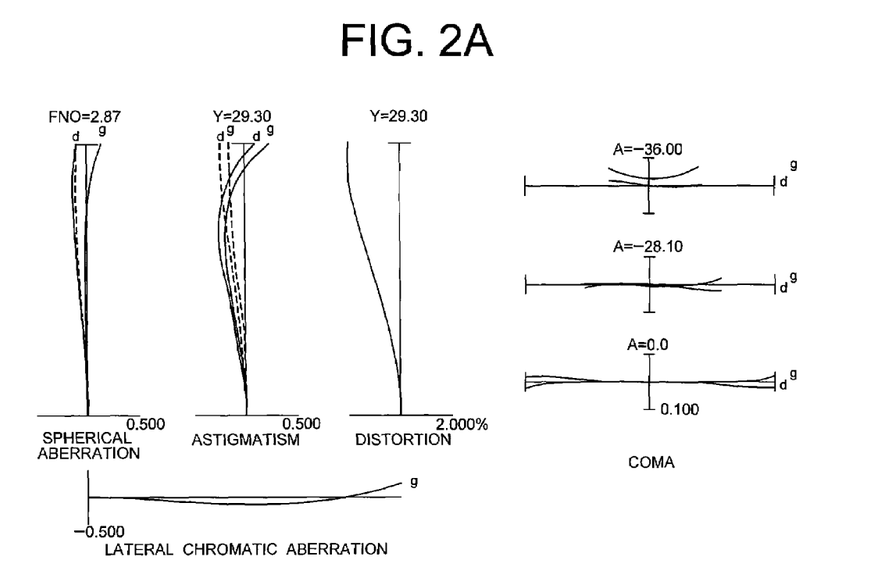
FIG. 2A shows various aberrations upon focusing on infinity.
Figure 2B:
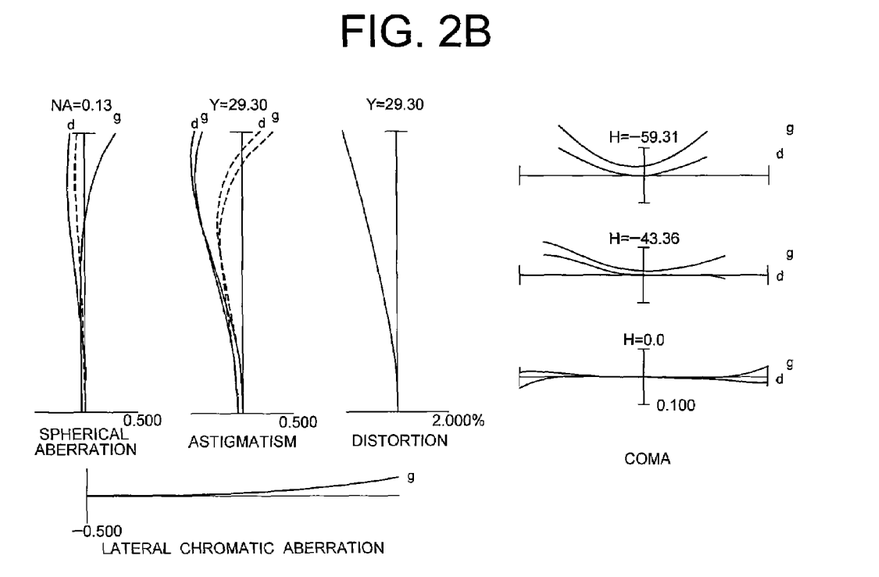
FIG. 2B shows various aberrations upon focusing on a close object (an imaging magnification of −0.5).

FIGS. 2A, and 2B are graphs showing various aberrations of the retrofocus lens system according to Example 1 in which FIG. 2A shows various aberrations upon focusing on infinity, and FIG. 2B shows various aberrations upon focusing on a close object (an imaging magnification of −0.5).

In respective graphs, FNO denotes an f-number, NA denotes a numerical aperture, Y denotes an image height, H denotes an object height, and A denotes a half angle of view (unit: degree). In the graphs showing spherical aberration, the f-number or the numerical aperture with respect to the maximum aperture is shown. In graphs showing astigmatism and distortion, the maximum value of an image height Y is shown. In graphs showing coma, coma with respect to each image height is shown.

In respective graphs, d denotes aberration curve at d-line (wavelength λ=587.6 nm), and g denotes aberration curve at g-line (wavelength λ=435.8 nm). In the graph showing astigmatism, a solid line indicates a sagittal image plane, and a broken line indicates a meridional image plane.

The above-described explanation regarding various aberration graphs is the same as the other Examples.

As is apparent from the respective graphs, the retrofocus lens system according to Example 1 shows superb optical performance as a result of good corrections to various aberrations.

EXAMPLE 2

Figure 3:
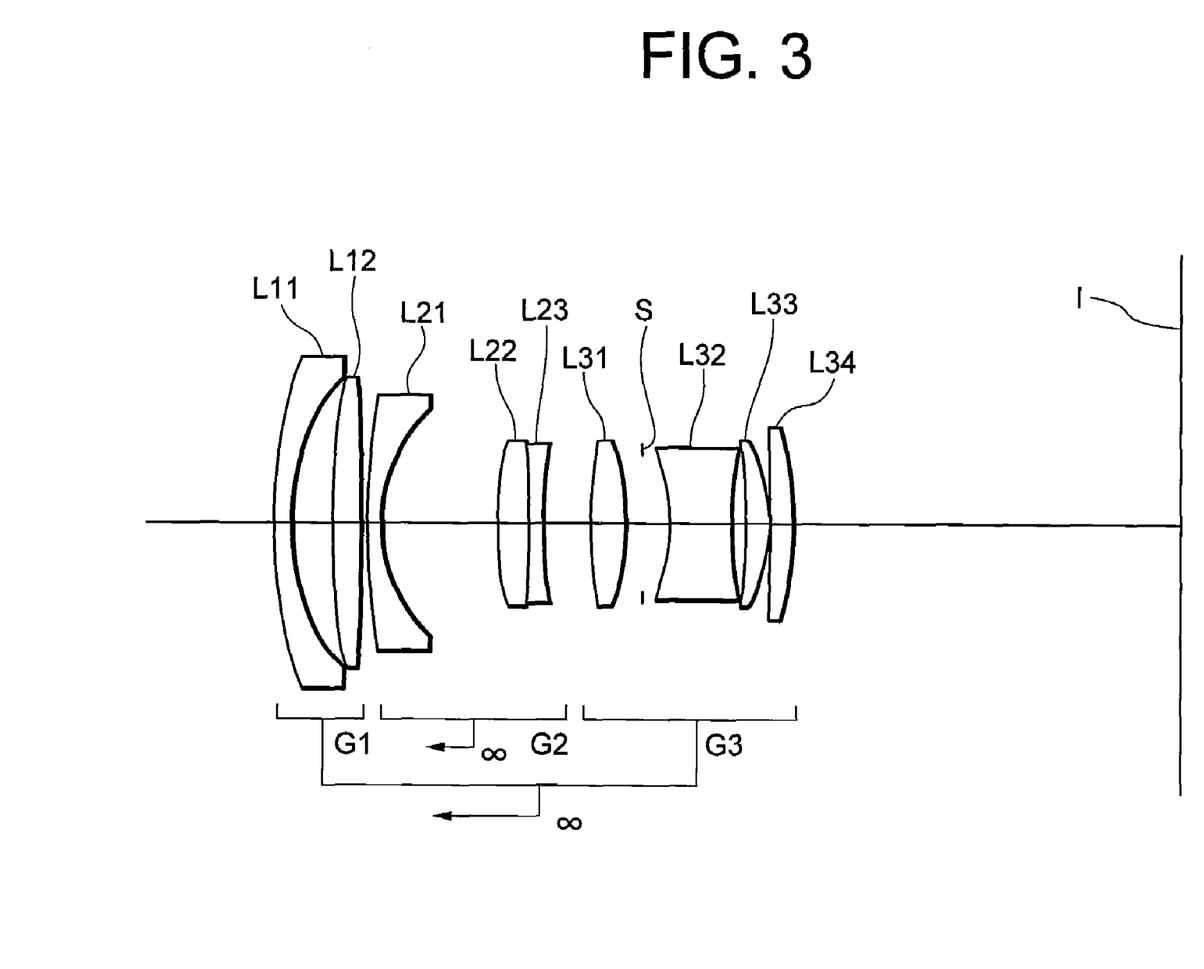
FIG. 3 is a diagram showing a lens configuration of a retrofocus lens system according to Example 2 of the present embodiment.

FIG. 3 is a diagram showing a lens configuration of a retrofocus lens system according to Example 2 of the present embodiment.

As shown in FIG. 3, the retrofocus lens system according to Example 2 consists of, in order from an object, a first lens group G1 having negative refractive power, a second lens group G2 having negative refractive power, and a third lens group G3 having positive refractive power.

The first lens group G1 consists of, in order from the object, a negative meniscus lens L11 having a convex surface facing the object, and a double convex positive lens L12.

The second lens group G2 consists of, in order from the object, a negative meniscus lens L21 having a convex surface facing the object, and a cemented positive lens constructed by a positive meniscus lens L22 having a convex surface facing the object cemented with a negative meniscus lens L23 having a convex surface facing the object.

The third lens group G3 consists of, in order from the object, a double convex positive lens L31, an aperture stop S, a double concave negative lens L32, a positive meniscus lens L33 having a convex surface facing an image, and a double convex positive lens L34.

With this lens configuration, in the retrofocus lens system according to Example 2 of the present embodiment, upon focusing from infinity to a close object, the first lens group G1, the second lens group G2, and the third lens group G3 are moved to the object side such that a distance between the first lens group G1 and the second lens group G2 increases, and a distance between the second lens group G2 and the third lens group G3 decreases. In particular, upon focusing, the moving ratio of the first lens group G1 to the third lens group G3 is the same, in other words, the first lens group G1 and the third lens group G3 are moved in a body to the object.

Various values associated with the retrofocus lens system according to Example 2 are listed in Table 2.

TABLE 2

[Specifications]

| | |
|---|---|
| f = | 41.2 |
| FNO = | 2.89 |
| 2ω = | 72° |

[Lens Data]

| | r | d | nd | νd |
|---|---|---|---|---|
| 1) | 71.182 | 2.5 | 1.7725 | 49.61 |
| 2) | 33.485 | 5.8 | | |
| 3) | 102.661 | 4.0 | 1.75692 | 31.59 |
| 4) | −913.364 | (d4) | | |
| 5) | 88.128 | 2.0 | 1.49782 | 82.56 |
| 6) | 21.965 | 17.0 | | |
| 7) | 43.206 | 4.5 | 1.816 | 46.63 |
| 8) | 628.340 | 2.0 | 1.57501 | 41.49 |
| 9) | 59.241 | (d9) | | |
| 10) | 59.135 | 5.0 | 1.603 | 65.47 |
| 11) | −43.390 | 3.0 | | |
| 12) | ∞ | 4.0 | Aperture Stop S | |
| 13) | −28.586 | 9.0 | 1.71736 | 29.52 |
| 14) | 72.203 | 2.0 | | |
| 15) | −101.563 | 3.5 | 1.49782 | 82.56 |
| 16) | −26.164 | 0.1 | | |
| 17) | 686.431 | 3.5 | 1.83481 | 42.72 |
| 18) | −55.148 | Bf | | |

[Variable Distances]

| | infinity | minimum imaging distance |
|---|---|---|
| β: | 0.00 | −0.50 |
| d0: | ∞ | 74.0 |
| d4: | 1.01 | 7.58 |
| d9: | 7.01 | 0.44 |

[Values for Conditional Expressions]

Figure 4A:
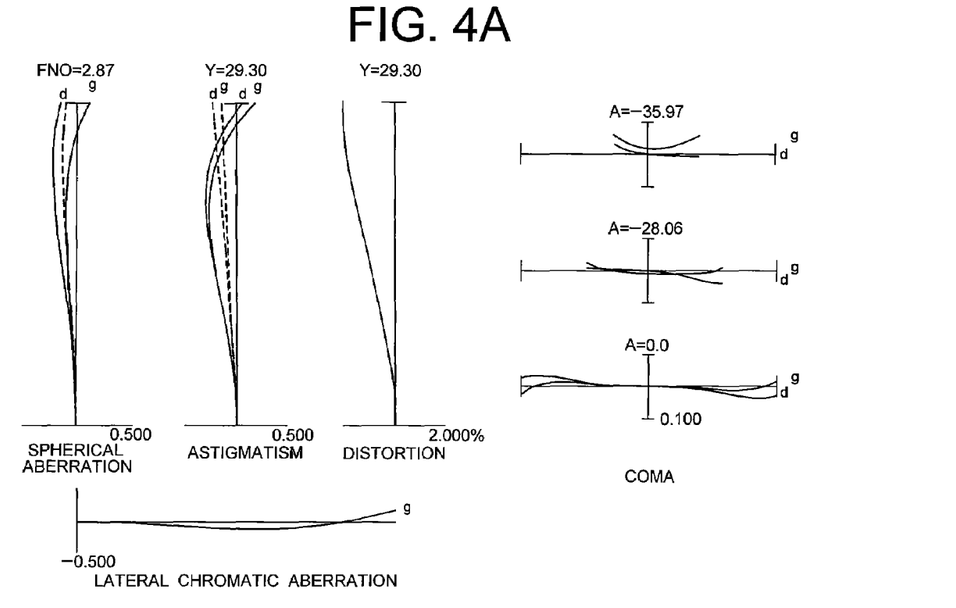
FIG. 4A shows various aberrations upon focusing on infinity.
Figure 4B:
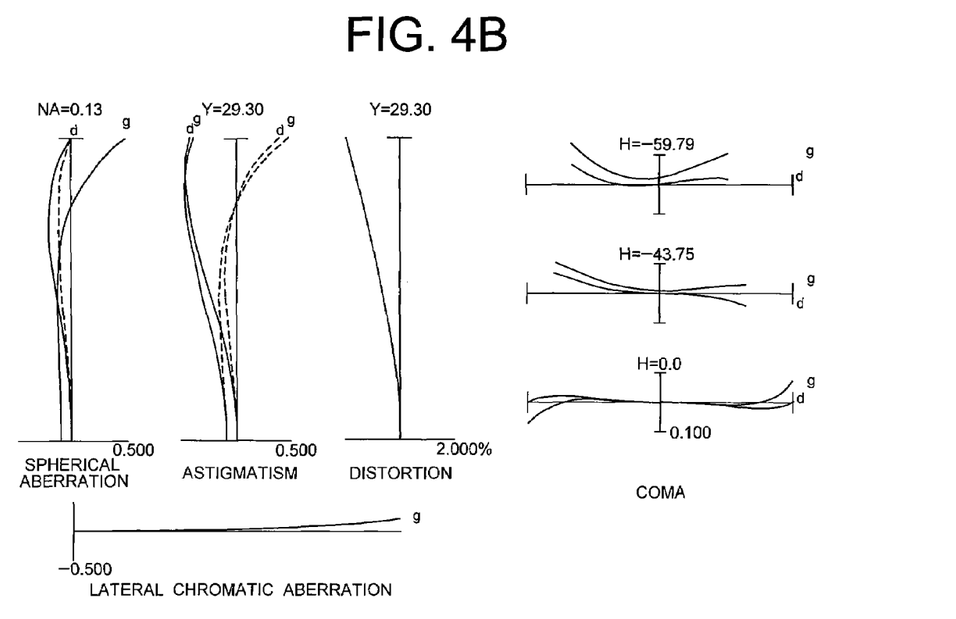
FIG. 4B shows various aberrations upon focusing on a close object (an imaging magnification of −0.5).

(1): $\Delta D1/(\beta \cdot D1) = -13.01$
(2): $(-\beta m) = 0.50$
(3): $\Delta D1 = 6.58$
    $-\Delta D2 = 6.58$
(4): $f1/f2 = 1.66$
(5): $(r2 + r1)/(r2 - r1) = 0.80$
(6): $\nu 32 = 82.56$ FIGS. 4A, and 4B are graphs showing various aberrations of the retrofocus lens system according to Example 2 in which FIG. 4A shows various aberrations upon focusing on infinity, and FIG. 4B shows various aberrations upon focusing on a close object (an imaging magnification of −0.5).

As is apparent from the respective graphs, the retrofocus lens system according to Example 2 shows superb optical performance as a result of good corrections to various aberrations.

EXAMPLE 3

Figure 5:
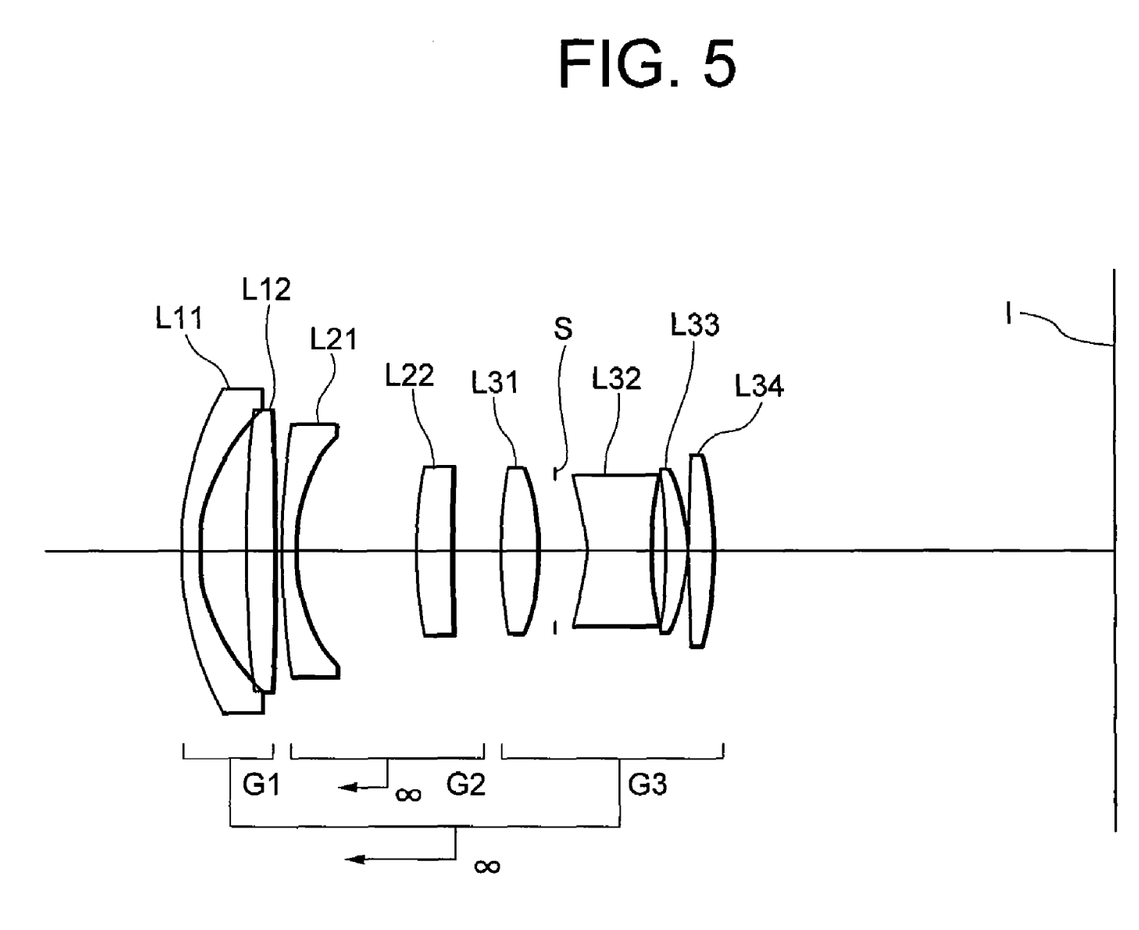
FIG. 5 is a diagram showing a lens configuration of a retrofocus lens system according to Example 3 of the present embodiment.

FIG. 5 is a diagram showing a lens configuration of a retrofocus lens system according to Example 3 of the present embodiment.

As shown in FIG. 5, the retrofocus lens system according to Example 3 consists of, in order from an object, a first lens group G1 having negative refractive power, a second lens group G2 having negative refractive power, and a third lens group G3 having positive refractive power.

The first lens group G1 consists of, in order from the object, a negative meniscus lens L11 having a convex surface facing the object, and a positive meniscus lens L12 having a convex surface facing the object.

The second lens group G2 consists of, in order from the object, a negative meniscus lens L21 having a convex surface facing the object, and a positive meniscus lens L22 having a convex surface facing the object.

The third lens group G3 consists of, in order from the object, a double convex positive lens L31, an aperture stop S, a double concave negative lens L32, a positive meniscus lens L33 having a convex surface facing an image, and a positive meniscus lens L34 having a convex surface facing the image.

With this lens configuration, in the retrofocus lens system according to Example 3 of the present embodiment, upon focusing from infinity to a close object, the first lens group G1, the second lens group G2, and the third lens group G3 are moved to the object side such that a distance between the first lens group G1 and the second lens group G2 increases, and a distance between the second lens group G2 and the third lens group G3 decreases. In particular, upon focusing, the moving ratio of the first lens group G1 to the third lens group G3 is the same, in other words, the first lens group G1 and the third lens group G3 are moved in a body to the object.

Various values associated with the retrofocus lens system according to Example 3 are listed in Table 3.

TABLE 3

[Specifications]

| f = | 41.2 |
|---|---|
| FNO = | 2.89 |
| 2ω = | 72° |

[Lens Data]

| | r | d | nd | νd |
|---|---|---|---|---|
| 1) | 45.878 | 2.5 | 1.7725 | 49.61 |
| 2) | 26.109 | 6.5 | | |
| 3) | 137.175 | 3.8 | 1.75692 | 31.59 |
| 4) | 1000.000 | (d4) | | |
| 5) | 85.239 | 2.0 | 1.49782 | 82.56 |
| 6) | 24.833 | 17.0 | | |
| 7) | 51.763 | 5.0 | 1.816 | 46.63 |
| 8) | 149.355 | (d8) | | |
| 9) | 74.600 | 5.0 | 1.72916 | 54.66 |
| 10) | −50.076 | 3.0 | | |
| 11) | ∞ | 4.0 | | Aperture Stop S |
| 12) | −30.599 | 9.3 | 1.72825 | 28.46 |
| 13) | 63.406 | 2.0 | | |
| 14) | −143.413 | 3.5 | 1.603 | 65.47 |
| 15) | −28.542 | 0.1 | | |
| 16) | −465.372 | 3.5 | 1.7725 | 49.61 |
| 17) | −53.935 | Bf | | |

[Variable Distances]

| | infinity | minimum imaging distance |
|---|---|---|
| β | 0.00 | −0.50 |
| d0 | ∞ | 72.2 |
| d4 | 1.01 | 6.66 |
| d8 | 7.01 | 1.36 |

[Values for Conditional Expressions]

Figure 6A:
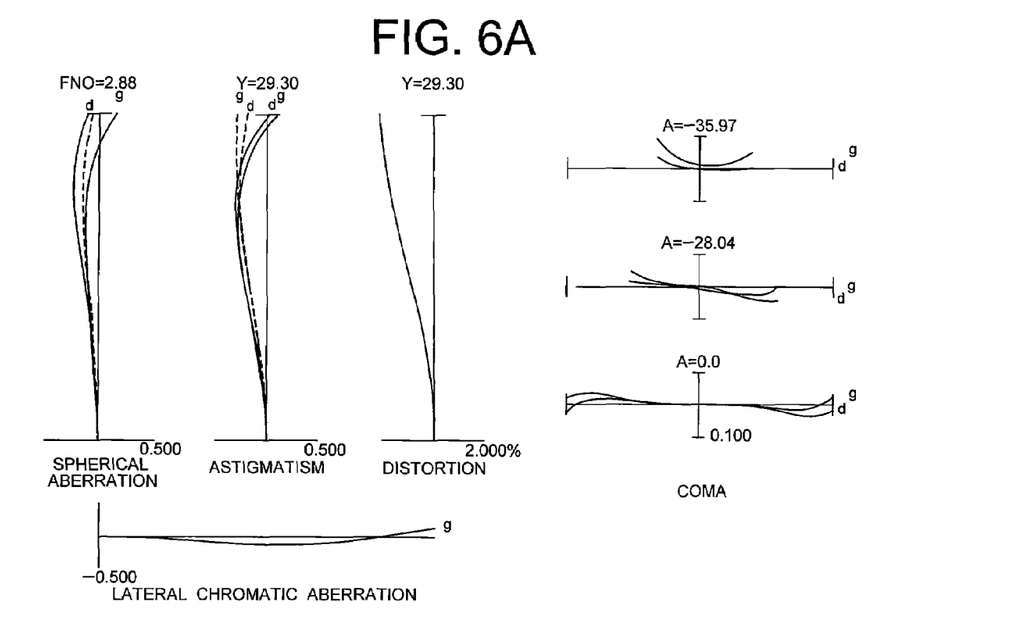
FIG. 6A shows various aberrations upon focusing on infinity.
Figure 6B:
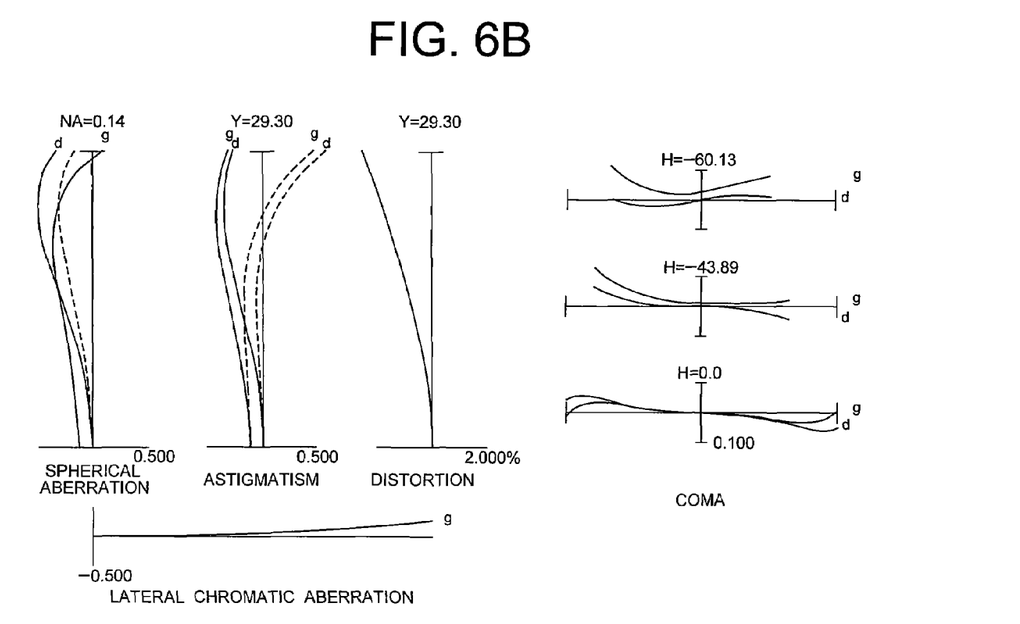
FIG. 6B shows various aberrations upon focusing on a close object (an imaging magnification of −0.5).

(1): $\Delta D1/(\beta \cdot D1) = -11.19$
(2): $(-\beta m) = 0.50$
(3): $\Delta D1 = 5.65$
      $-\Delta D2 = 5.65$
(4): $f1/f2 = 0.18$
(5): $(r2 + r1)/(r2 - r1) = 1.32$
(6): $\nu 32 = 65.47$ FIGS. 6A, and 6B are graphs showing various aberrations of the retrofocus lens system according to Example 3 in which FIG. 6A shows various aberrations upon focusing on infinity, and FIG. 6B shows various aberrations upon focusing on a close object (an imaging magnification of −0.5).

As is apparent from the respective graphs, the retrofocus lens system according to Example 3 shows superb optical performance as a result of good corrections to various aberrations.

As described above, each example of the present embodiment makes it possible to provide a retrofocus lens system having small variation in aberrations upon focusing on a close object with a high imaging magnification, and an angle of view of 70 degrees or more, suitable for a single-lens reflex camera and a digital still camera.

It is needless to say that although a retrofocus lens system with a three-lens-group configuration is shown in each Example of the present invention, a lens system simply added by a lens group to a three-lens-group configuration is included in the spirit of the present invention. Moreover, in the configuration of each lens group, a lens group simply added by additional lens elements to the lens group shown in each Example is included in the spirit or scope of the present invention.

In a retrofocus lens system according to the present embodiment, in order to correct an image blur caused by a camera shake, a portion of a lens group or a lens group may be constructed to be moved in a direction perpendicular to the optical axis. In a retrofocus lens system according to the present embodiment, it is preferable that the positive lens L31 is used as a vibration reduction lens group.

Any lens surface of a retrofocus lens system according to each Example may be an aspherical surface. The aspherical surface may be fabricated by a fine grinding process, a glass molding process that a glass material is formed into an aspherical shape by a mold, or a compound type process that a resin material is formed into an aspherical shape on a glass surface.

In a retrofocus lens system according to each Example, an antireflection coating having high transmittance over a broad wavelength range may be applied to each lens surface to reduce flare or ghost images, so that high optical performance with a high contrast can be attained.

Figure 7:
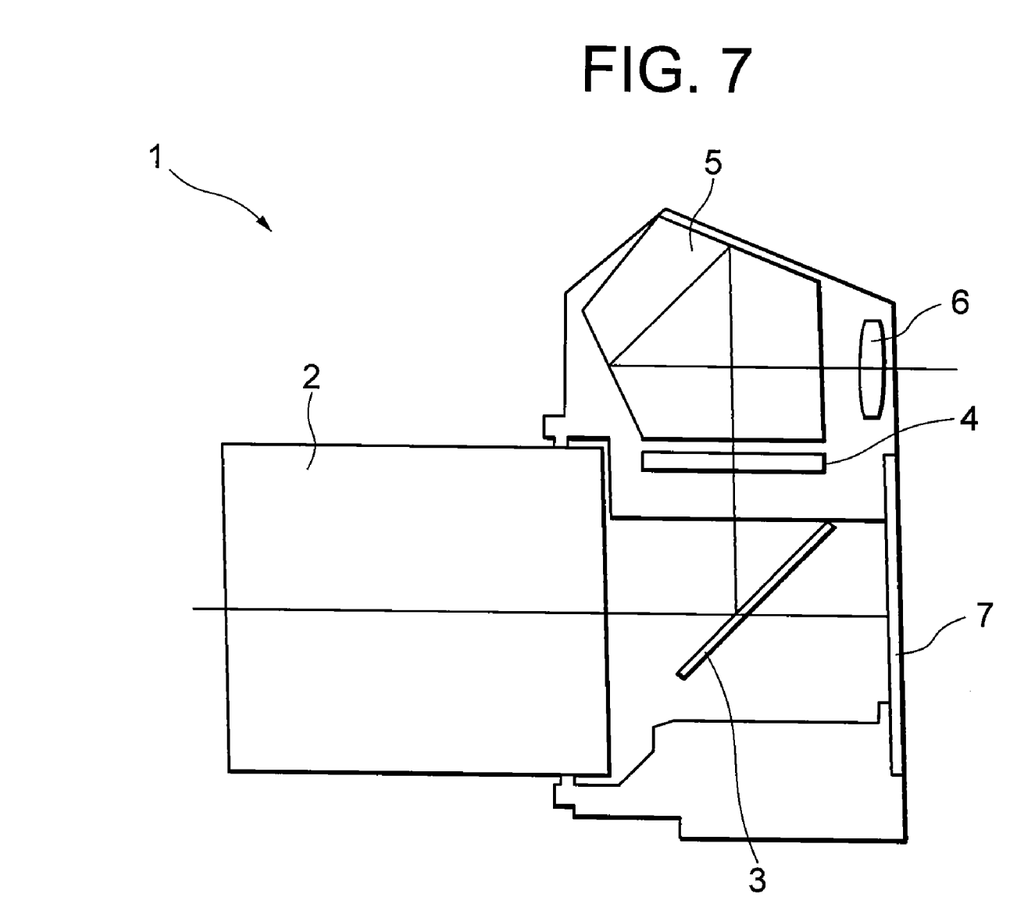
FIG. 7 is a diagram showing a camera equipped with the retrofocus lens system according to the present embodiment.

Then, a camera equipped with a retrofocus lens system is explained with reference to FIG. 7. FIG. 7 is a diagram showing a camera equipped with the retrofocus lens system according to the present embodiment. As shown in FIG. 7, the camera 1 is a single-lens reflex digital camera equipped with the retrofocus lens system according to Example 1 as an image-taking lens 2.

In the camera 1, light emitted from a subject (not shown) is converged by an image-taking lens 2, and focused on a focusing screen 4 through a quick return mirror 3. The subject image focused on the focusing screen 4 is reflected a plurality of times by a pentagonal roof prism 5, and lead to an eyepiece 6. Therefore, a photographer can observe the subject image as an erected image through the eyepiece 6.

When the photographer presses a release button (not shown), the quick return mirror 3 is removed from an optical path, and the light from the subject (not shown) reaches an imaging device 7. The light from the subject is captured by the imaging device 7 and stored in a memory (not shown) as a subject image. In this manner, the photographer can take picture of the subject by the camera 1.

As explained in Example 1, the retrofocus lens system according to Example 1 attached to the camera 1 as an image-taking lens 2 makes it possible to accomplish small variation in aberrations upon focusing on a close object with a high imaging magnification, and an angle of view of 70 degrees or more by means of the specific lens configuration and the method for focusing. Accordingly, the present embodiment makes it possible to provide a camera having small variation in aberrations upon focusing on a close object with a high imaging magnification.

The present invention is not limited to the above-mentioned case. It is needless to say that the similar effect as the above-described camera 1 can be obtained by using a camera equipped with the retrofocus lens system according to Example 2 or 3 as an image-taking lens 2.

As described above, the present embodiment makes it possible to realize a retrofocus lens system and an image-taking device having small variation in aberrations upon focusing on a close object with a high imaging magnification.

Additional advantages and modifications will readily occur to those skilled in the art. Therefore, the invention in its broader aspect is not limited to the specific details, and representative devices shown and described herein. Accordingly, various modifications may be made without departing from the spirit or scope of the general inventive concept as defined by the appended claims and their equivalents.

What is claimed is:

1. A retrofocus lens system comprising, in order from an object:
   a first lens group having negative refractive power;
   a second lens group having negative refractive power; and
   a third lens group having positive refractive power;
   wherein upon focusing from infinity to a close object, the first lens group, the second lens group, and the third lens group are moved to the object such that a distance between the first lens group and the second lens group increases, and a distance between the second lens group and the third lens group decreases, and
   wherein the following conditional expression is satisfied:

$$0.25 < (-\beta m)$$

where $\beta m$ denotes an imaging magnification upon focusing on an object locating at the minium imaging distance.

2. A retrofocus lens system comprising, in order from an object:
   a first lens group having negative refractive power;
   a second lens group having negative refractive power; and
   a third lens group having positive refractive power;
   wherein upon focusing from infinity to a close object, the first lens group, the second lens group, and the third lens group are moved to the object such that a distance between the first lens group and the second lens group increases, and a distance between the second lens group and the third lens group decreases, and
   wherein the following conditional expression is satisfied:

$$-30 < \Delta D1/(\beta \cdot D1) < -7$$

where $\beta$ denotes an imaging magnification upon focusing on a close object, D1 denotes a distance between the first lens group and the second lens group upon focusing on infinity, and $\Delta D1$ denotes variation in the distance between the first lens group and the second lens group upon focusing from infinity to a close object with an imaging magnification of $\beta$.

3. The retrofocus lens system according to claim 2, wherein the imaging magnification $\beta$ is a magnification $\beta m$ upon focusing on an object locating at the minimum imaging distance.

4. The retrofocus lens system according to claim 3, wherein the following conditional expression is satisfied:

$$0.25 < (-\beta m)$$

where $\beta m$ denotes an imaging magnification upon focusing on an object locating at the minimum imaging distance.

5. The retrofocus lens system according to claim 1, wherein the following conditional expression is satisfied:

$$\Delta D1 = -\Delta D2$$

where $\Delta D1$ denotes variation in the distance between the first lens group and the second lens group upon focusing from infinity to a close object with an imaging magnification of $\beta$, and $\Delta D2$ denotes variation in the distance between the second lens group and the third lens group upon focusing from infinity to a close object with an imaging magnification of $\beta$.

6. The retrofocus lens system according to claim 1, wherein the following conditional expression is satisfied:

$$0.1 < f1/f2 < 10$$

where f1 denotes a focal length of the first lens group, and f2 denotes a focal length of the second lens group.

7. The retrofocus lens system according to claim 1, wherein the first lens group consists of, in order from the object, a negative meniscus lens having a convex surface facing the object, and a positive lens.

8. The retrofocus lens system according to claim 1, wherein the following conditional expression is satisfied:

$$0.5 < (r2+r1)/(r2-r1) < 3.0$$

where r1 denotes a radius of curvature of the object side surface of the positive lens in the first lens group, and r2 denotes a radius of curvature of the image side surface of the positive lens in the first lens group.

9. The retrofocus lens system according to claim 1, wherein the following conditional expression is satisfied:

$$60 < \nu 32 < 83$$

where $\nu 32$ denotes Abbe number of a glass medium of the second lens from the image side of the third lens group at d-line which has a wavelength $\lambda = 587.6$ nm.

10. The retrofocus lens system according to claim 1, wherein an aperture stop is included in the third lens group.

11. The retrofocus lens system according to claim 1, wherein each lens surface of the retrofocus lens system is formed by a spherical surface or a plane surface.

12. The retrofocus lens system according to claim 1, wherein the first lens group comprises at least two lenses.

13. An image-taking device including a retrofocus lens system, the retrofocus lens system comprising, in order from an object:
    a first lens group having negative refractive power;
    a second lens group having negative refractive power; and
    a third lens group having positive refractive power;
    wherein upon focusing from infinity to a close object, the first lens group, the second lens group, and the third lens group are moved to the object such that a distance between the first lens group and the second lens group increases, and a distance between the second lens group and the third lens group decreases, and
    wherein the following conditional expression is satisfied:

$$0.25 < (-\beta m)$$

where $\beta m$ denotes an imaging magnification upon focusing on an object locating at the minimum image distance.

14. A method for forming an image of an object by focusing a retrofocus lens system comprising steps of:
    providing the retrofocus lens system including, in order from an object, a first lens group having negative refractive power, a second lens group having negative refractive power, and a third lens group having positive refractive power; and
    moving the first lens group, the second lens group, and the third lens group to the object, upon focusing from infinity to a close object, such that a distance between the first lens group and the second lens group increases, and a distance between the second lens group and the third lens group decreases; and
    satisfying the following conditional expression:

$$0.25 < (-\beta m)$$

where $\beta m$ denotes an imaging magnification upon focusing on an object locating at the minium imaging distance.

15. The method according to claim 14, further comprising a step of:
    satisfying the following conditional expression:

$$\Delta D1 = -\Delta D2$$

where $\Delta D1$ denotes variation in the distance between the first lens group and the second lens group upon focusing from infinity to a close object with an imaging magnification of β, and ΔD2 denotes variation in the distance between the second lens group and the third lens group upon focusing from infinity to a close object with an imaging magnification of β.

16. A method for forming an image of an object by focusing a retrofocus lens system comprising steps of:
provide the retrofocus lens system including, in order from an object, a first lens group having negative refractive power, a second lens group having negative refractive power, and a third lens group having positive refractive power;
moving the first lens group, the second lens group, and the third lens group, upon focusing from infinity to a close object, such that a distance between the first lens group and the second lens group increases, and a distance between the second lens group and the third lens group decreases; and
satisfying the following conditional expression:

$$-30 < \Delta D1/(\beta \cdot D1) < -7$$

where β denotes an imaging magnification upon focusing on a close object, D1 denotes a distance between the first lens group and the second lens group upon focusing on infinity, and ΔD1 denotes variation in the distance between the first lens group and the second lens group upon focusing from infinity to a close object with an imaging magnification of β.

* * * * *